Sept. 12, 1939. H. A. FLOGAUS 2,172,653
OVERRUNNING CLUTCH
Filed July 22, 1935
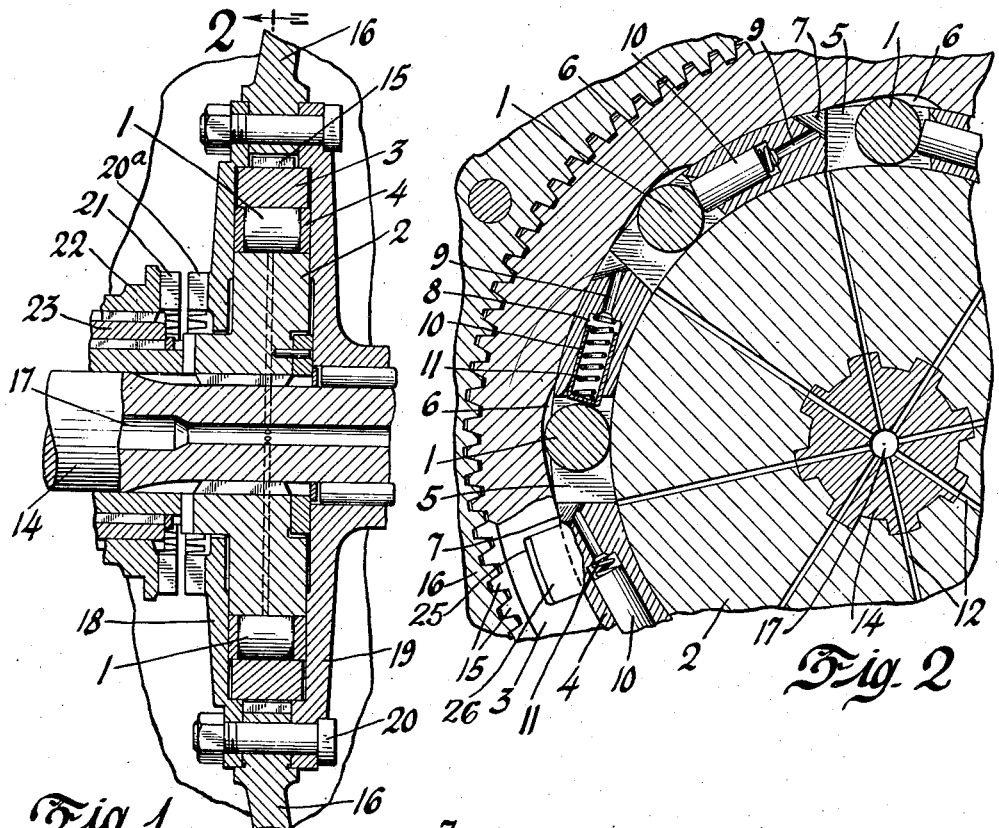
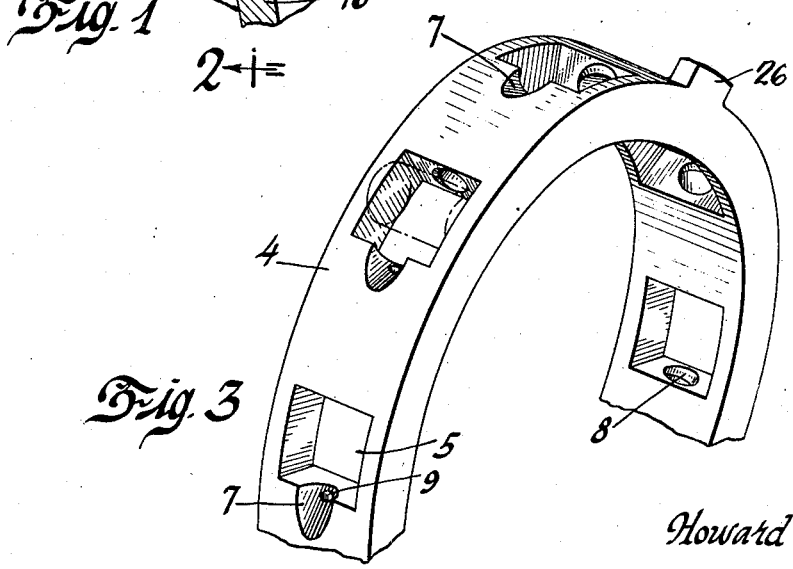
Inventor
Howard A. Flogaus
By Blackmore, Spencer & Flint
Attorneys Patented Sept. 12, 1939

2,172,653

UNITED STATES PATENT OFFICE 2,172,653

OVERRUNNING CLUTCH

Howard A. Flogaus, Ferndale, Mich., assignor, by mesne assignments, to Yellow Truck and Coach Manufacturing Company, Pontiac, Mich., a corporation of Maine Application July 22, 1935, Serial No. 32,526

18 Claims. (Cl. 192—45)

My invention relates to overrunning clutches for the transmission of power and is proposed for use as a part of the driving mechanism of a motor vehicle. More particularly it has to do with that type of structure wherein a pair of concentrically arranged members are driven one from the other through wedging rollers therebetween for clutching the members together.

The subject matter hereof was designed to provide improved performance throughout a long period of use in installations subject to more than usual hardships. Such installations include use on buses for city service which operate at almost continuously variable speed in heavy traffic and with frequent starts and stops. One of the causes of failure in devices heretofore employed has been the wear and scoring of the bearing surfaces. This is due in part to the fact that during the free-wheeling action the clutch elements carried by one member slide rather than truly roll on the bearing surface of the other member. Among the things I have done to correct past troubles is to locate the clutching elements in the outer member wherefore I take advantage of centrifugal force during overrunning operation to keep the elements out of sliding contact with the peripheral bearing surface of the inner member and to assist this inherent action I provide for the delivery of lubricating oil under constant pressure from a pressure source radially outwardly from the inner member. The oil not only affords a protective lubricant film but the pressure thereon normally tends to push the clutch elements outwardly and away from the bearing surface of the inner member.

Of special importance in my design is the structure of the outer member which carries the clutching elements. This I form as two rings nested together, the inner one of which preferably is of bronze or the like to receive and afford a bearing for the central member rotatable relative thereto. To locate the clutching elements, the innermost ring is provided with a number of radial openings therethrough and since such openings may be machined prior to assembly their formation and completion is simple and easy inasmuch as the manufacturing operations are performed from outside the ring with tools entering the openings peripherally inwardly. Complicated machining operations also are eliminated in the formation of the outer ring which carries the camming surfaces of the clutch elements. With an ordinary broaching tool entering the central opening through the ring in an axial direction sufficient material is removed entirely across the inner face of the ring at circumferentially spaced intervals to afford a series of grooves shaped to the proper camming angle according to predetermined selection. To urge the clutch elements to ride inwardly on the camming surfaces it is customary to use spring followers and these I mount slidably in drilled openings in the lands of the inner ring between succeeding locating openings for the clutch elements. Such plunger receiving openings may be worked also from the outside by directing the drill in a substantially tangential direction through each land from the face thereof which defines one side of an adjacent radial opening.

For a better understanding of what is involved reference should be made to the preferred, but not necessarily the only embodiment illustrated in the accompanying drawing, wherein Figure 1 shows in section the application of the invention to a part of a power transmitting train for driving a motor vehicle; Figure 2 is an enlarged view of the clutch mechanism in transverse section as on line 2—2 of Figure 1, and Figure 3 illustrates in perspective a portion of the bearing ring constituting a part of the outer member of the clutch.

In the drawing the numerals 1—1 indicate a series of clutch elements preferably consisting of hardened cylindrical rollers interposed between the central member or hub 2 and the ring 3 of the outer member. The periphery of the hub is cylindrical in shape and in bearing engagement therewith is the inner cylindrical surface of an intermediate ring or sleeve 4 nested within and pinned or otherwise fixed to the outer ring 3 to constitute a unit therewith. Aperture or opening 25 in member 3 of Figure 2 and lug 26 of retainer ring 4 of Figure 3 constitute an approved method for insuring that 3 and 4 rotate together. One or more such lugs and slots may be used as required. The intermediate ring 4 preferably is of a relatively soft bearing material, such as bronze, while the hub 2 and the outer ring 3 are of a material sufficiently hard to withstand wear incident to the wedging action therebetween of the clutching rollers 1. The hub 2, intermediate ring 4 and outer member 3 constitute a means to shroud rollers 1 within the assembly, as will be seen from the following description.

Circumferentially spaced openings or pockets 5 in the ring 4 serve to locate the rollers in the assembly and in width the openings substantially agree with the length of the rollers to guard against cocking of the loose rollers, while circumferentially the openings are larger than the roller diameter to allow necessary movement between the locked and unlocked positions of the rollers. Diametrically the rollers slightly exceed the thickness of the bearing ring 4 and extend therebeyond into the cam grooves 6 formed on the inside of the ring 3 in alinement with the radial openings 5. It will be seen from Figure 2 that ring 4 of bearing material presents a frictional surface bearing to the inner portion of member 3, and a second surface bearing on the outer part of member 2. The above mentioned excess roller thickness represents the depth of cams 6 plus the increments for running fit clearances and allowance for modulus of elasticity of the loaded parts.

At each opening, the land on one side is provided with a rounded depression or groove 7 extending inwardly for clearance purposes to be hereinafter referred to. The land on the other side of the opening has extending from the face thereof a substantially tangentially disposed bore 8 which is shouldered at an intermediate point with an opening 9 of reduced size extending to the opposite face of the land. Slidable in the bore 8 is a cup-shaped plunger or tappet 10, the cylindrical skirt of which affords a bearing surface therefor with the closed end bearing on the roller to follow roller movement. Seating interiorly of the tappet is one end of a coiled compression spring 11 whose opposite end is seated on the shoulder of the bore. As seen in Figure 2 the construction of the spring follower is such that it urges the roller to ride inwardly on the camming surface of the groove 6 for wedging the members 2 and 3 together for unisonal rotation. In the reciprocation of the tappet, the reduced opening 9 serves to prevent the entrapment of air or liquid behind the plunger.

For lubricating the parts, the inner member or the hub is provided with a plurality of ducts or passages 12 drilled radially therein, for delivering from a suitable source such as an engine or output shaft driven pump and sump, oil under pressure which flows outwardly and which during periods of overrun provides a constantly replaced lubricating film between the relatively movable parts and also urges the rollers away from the peripheral surface of the hub.

In the manufacture of the clutch, the procedure is extremely simple, especially as concerns the locating openings for the rollers and the camming surfaces associated therewith. The production of the outer member by joining two separately formed rings eliminates difficulties and expensive machining expedients, inasmuch as each ring can be easily worked with standard machine shop equipment. As far as the outer ring 3 is concerned, this carries only the camming grooves 6, and since these grooves extend entirely across the inner face of the ring all that is necessary for their formation is to introduce a broaching tool in an axial direction interiorly of the ring. As regards the bearing ring 4, this may be cast with the radial openings 5 therein or may be worked from solid stock, but in any event the machining operations thereon may be performed from the outside of the ring with the cutting and dressing tools entering the ring from the periphery. The openings 8 in the several lands may likewise be bored from the outside with the drills directed in substantially tangential relation against one face of the land through an adjacent opening 5. It is in this connection that the groove 7 is provided in the opposite face of the adjacent land, the depression serving to afford clearance for the drilling tool.

When the operation of the parts is such that the rollers ride inwardly on the camming surfaces they are wedged between the inner and outer members 2 and 3 and cause these members to rotate in unison. During periods of overrun the rollers move outwardly in the cam slots to unlock the parts for relative rotation. Centrifugal force on the rollers serves to hold them outwardly and away from the peripheral surfaces of the inner member 2 and in the absence of a dragging action on the clutching surfaces, excessive wear and scoring does not take place.

For illustrative purposes Figure 1 shows the clutch embodied in an installation wherein the inner member 2 is splined on a driven shaft 14 and the outer member 3 is keyed through toothed formations 15 to a driving member 16. Lubricant under pressure for the bearing surfaces is constantly supplied to the passages 12 through a drilled opening 17 in the shaft 14 and a series of radial openings extending therefrom in alined relation to the passages 12. The inner and outer members of the clutch are held in assembled relation between a pair of side plates 18 and 19 carried by and secured to the driving member 16 by a series of bolts or studs 20. These side plates fit closely enough so that there is a tendency for the oil leakage path from the roller pockets in ring 4 to be restrained. The plate 18 at its center is provided with clutch teeth 29ᵃ adapted for driving engagement with cooperating teeth 21 upon a slider sleeve 22 which is splined on a driven shaft 23. Upon engagement of the clutching elements 20ᵃ and 21 the drive from the member 16 is transmitted through the plate 18 to the shaft 23, at which time the clutching rollers 1 of the overrunning clutch are inoperative to permit relative movement between the inner and outer members of the clutch. When, however, the jaw clutch is disengaged, the drive from the member 16 causes the rollers 1 automatically to pick up the inner member 2 and drive this output shaft 14 as a unit with the driving member 16. The shaft 23, it should be understood, may be operatively connected through suitable step up gearing, not shown, with the shaft 14, in which case the inner member 2 carried by the shaft overruns or travels at a rate of speed in excess of that of the outer member 3.

It should be noted that the bearing fits between member 4 and both of members 3 and 2 provide against excessive leakage of oil from the pockets in which rollers 1 are enclosed, so that pressure lubricant from line 17 through drillings 12 is restrained from outflow in the pocket and bearing surface areas. The side fits of members 18 and 19 improve the ability of the roller pockets to hold oil pressure.

I claim:

1. In an overrunning clutch, an inner member having a circumferentially continuous clutching surface, an outer member comprising a pair of nested rings in fixed relation to each other, one of the rings having a series of spaced camming grooves on its interior surface and the other ring fitting inside the first and having in alinement with each groove an enclosed radial opening therethrough, a wedging member received within each opening and adapted to ride in the cam groove into or out of engagement with the clutching surface of the inner member, and means to maintain said enclosed radial openings under lubricant pressure.

2. An overrunning clutch, including inner and outer members adapted to be clutched together and a clutching element therebetween, the outer member comprising a pair of separately formed rings nested in fixed relation one in the other, the innermost ring having a shrouded opening extended radially therethrough to receive and allow movement of the clutching element into and out of clutching engagement with the inner member, the other ring having a camming surface in alinement with said opening for cooperation with the clutching element and means continuously operative to supply said shrouded opening with lubricant under pressure.

3. In an overrunning clutch, inner and outer members relatively rotatable one within the other, a series of wedging elements engageable with the periphery of the inner member and with camming surfaces on the outer member to clutch said members together, and a bearing sleeve for the inner member rotatable with the outer member enclosing said wedging elements and adapted to locate the wedging elements in operative relation to said camming surfaces.

4. In a device of the character described, inner and outer rotatable members of relatively hard material, an intermediate rotatable member in bearing relationship to said members, and a series of wedging elements restrained in enclosing pockets carried by the intermediate member and movable relative thereto for clutching said inner and outer members together said intermediate member comprising a bushing of relatively soft material rotatable with one member for bearing engagement with the other member.

5. In a device of the character described, an outer ring having a series of circumferentially spaced camming surfaces thereon, an intermediate bearing ring fixed against rotation relative to the outer ring and provided with shrouded openings therethrough in radial alinement with said camming surfaces, clutching elements located in said openings for cooperation with said camming surfaces, and an inner member having a rotatable bearing in said intermediate ring and clutchably engageable by said elements, said member having a number of outwardly extending ducts therein for supplying lubricant under pressure to the bearing surfaces.

6. In an overrunning clutch wherein a series of clutching elements are carried by an outer member for clutching engagement with a central member, an outer member comprising a pair of nested rings, one of the rings providing a bearing for the central member and having a number of preformed shrouded radial openings therein machineable peripherally of the ring and adapted to contain the clutching elements, and the other ring having interiorly thereof in radial alinement with said openings, a series of camming surfaces for cooperation with the clutching elements, said surfaces being of such character as to be machineable with a forming tool introduced axially therein.

7. In an overrunning clutch wherein a series of clutching elements are carried by an outer member for clutching engagement with a central member, an outer member comprising a pair of nested rings, one of said rings having a series of circumferentially spaced cam grooves extending across the inner side thereof and being adapted for machining by an axial insertion of a forming tool therein, the other ring having radial openings therethrough alined with said cam grooves to receive the clutching elements, with the lands between said openings each provided with a clutch spring follower receiving bore drilled substantially tangentially therein from one side of an adjacent opening by the introduction of a drilling tool from the ring periphery.

8. In an overrunning clutch including output and input members, a cam plate arranged to rotate with one of the members, a race arranged to rotate with the other of the members, a unitary intermediate member disposed to rotate between said plate and said race, rollers mounted in said intermediate member to engage said plate and said race, means to cause said intermediate member to rotate with said cam plate, and bearing surfaces between said intermediate member and both said plate and said race operative to support the weight of said intermediate member, said plate and said rollers on said race.

9. In an overrunning clutch, relatively rotatable outer and inner members, wedging elements engageable with the inner periphery of the outer member, and with the outer periphery of the inner member, one of said members having camming surfaces by which said elements may clutch said members together, an intermediate member comprising a single piece in which said elements are mounted and uniformly spaced so as to distribute the camming pressures evenly, and bearing surfaces formed on said intermediate member and both said outer and inner members operative to support the weight of said outer member, said intermediate member and said elements on the inner member when said wedging elements are declutched from said outer and inner members.

10. In an overrunning clutch, an outer member, an inner member and an intermediate member, bearing surfaces therebetween, gripping rollers in said intermediate member, enclosed roller pockets formed in said intermediate member having outlets through said bearing surfaces, a lubricant pressure space, and connecting lubricating passages in said inner member effective to deliver lubricant to said rollers, whereby a positive lubricant pressure is maintained within said pockets, and said surfaces constantly lubricated under said pressure.

11. In overrunning clutches, an input member, an output member, an intermediate member having pockets enclosing wedging bodies and bearing surfaces cooperating with both said members, pressure lubricant means connected to said pockets, and pressure relief means whereby oil under pressure within said pockets may flow through and lubricate said surfaces.

12. In roller clutch construction, in combination, driving, driven and intermediate members, enclosed spaced pockets in said intermediate member, rollers in said pockets, cams integral with one of said driving or driven members whereby said rollers may clutch said driving and driven members together, bearing surfaces between said intermediate member and both said driving and driven members, auxiliary lubricant pressure means connected to said pockets, and means effective to permit outward flow of lubricant from said pockets only through said bearing surfaces.

13. The combination of a clutch and a bearing mechanism comprising an outer ring member, an inner ring member having a continuous outer bearing surface, an interposed unitary bearing member mounted for rotation with said first named member and presenting a continuous bearing surface to said second named member, cam surfaces spaced uniformly apart in one of said first two named members and inclined in one hand of rotation of said mechanism, and wedging members supported by said interposed member and operative to wedge with said cam surfaces upon relative motion between said outer and inner ring members in one direction, and operative to permit free running of said ring members upon relative motion in the opposite direction.

14. In combined clutch and bearing mechanisms, a driving member, a driven member, an interposed ring shaped member in bearing relationship with said first two named members having continuous circumferential bearing surfaces and thereby adapted to support bearing loads therebetween said interposed member being attached for unitary rotation with one of said members, one-way locking cam surfaces formed on one of said first two named members, enclosing pockets formed in said interposed member, and wedging elements carried by said interposed member within said pockets coacting with said one-way cam surfaces effective to transmit drive between said driving and driven members upon relative rotation of one hand, while ineffective to transmit drive upon relative rotation of the opposite hand.

15. In one-way roller clutches, in combination, an inner race member presenting a common external locking surface and bearing surface, an intermediate member having continuous bearing relationship with the outer surface of said inner race member and rotatable freely with respect thereto, an outer member rotating with and supported by said intermediate member and having locking cam surfaces formed therein, and wedging elements carried by said intermediate member adapted to coact between said external locking surface of said inner race member and said locking cam surfaces, selectively operative or inoperative to lock the said outer and inner race members for synchronous rotation.

16. In roller clutches, in combination, an inner member, an outer member, an intermediate member in bearing relationship to said members, wedging elements carried by one of said members and adapted to transmit drive between the other two members, shrouding pockets formed by said members for said elements, a lubricant pressure space, fluid pressure porting connecting said space and said pockets, and restricted pressure relief outlets leading from said pockets effective to sustain a velocity flow of lubricant upon pressure being supplied said lubricant space.

17. In clutching mechanisms, in combination, a driving member, a driven member, an intermediate one-piece member interposed radially between said first named members and affording continuous bearing support for one of said first two named members, uniformly-spaced enclosing pockets extending radially through said intermediate member, wedging elements enclosed within said pockets adapted to establish one way drive between said driving and driven members, and a jaw clutch member mounted for positive rotation with one of said first named two members and supported for axial alignment through the bearing action of said intermediate member.

18. In clutching mechanisms, in combination, a driving member, a driven member, an intermediate member carried on one of said members in continuous bearing relation and supporting the other of said members against axial misalignment, enclosing pockets formed in said intermediate member, wedging bodies housed within said pockets effective to establish one-way drive between said driving and driven members, and a jaw clutch member mounted for fixed rotation with one of said first named members and supported by the bearing action of said intermediate member against axial misalignment.

HOWARD A. FLOGAUS.